A. R. GUSTAFSON.
IRONING MACHINE.
APPLICATION FILED JAN. 3, 1916.
Reissued Feb. 22, 1916.
14,074.
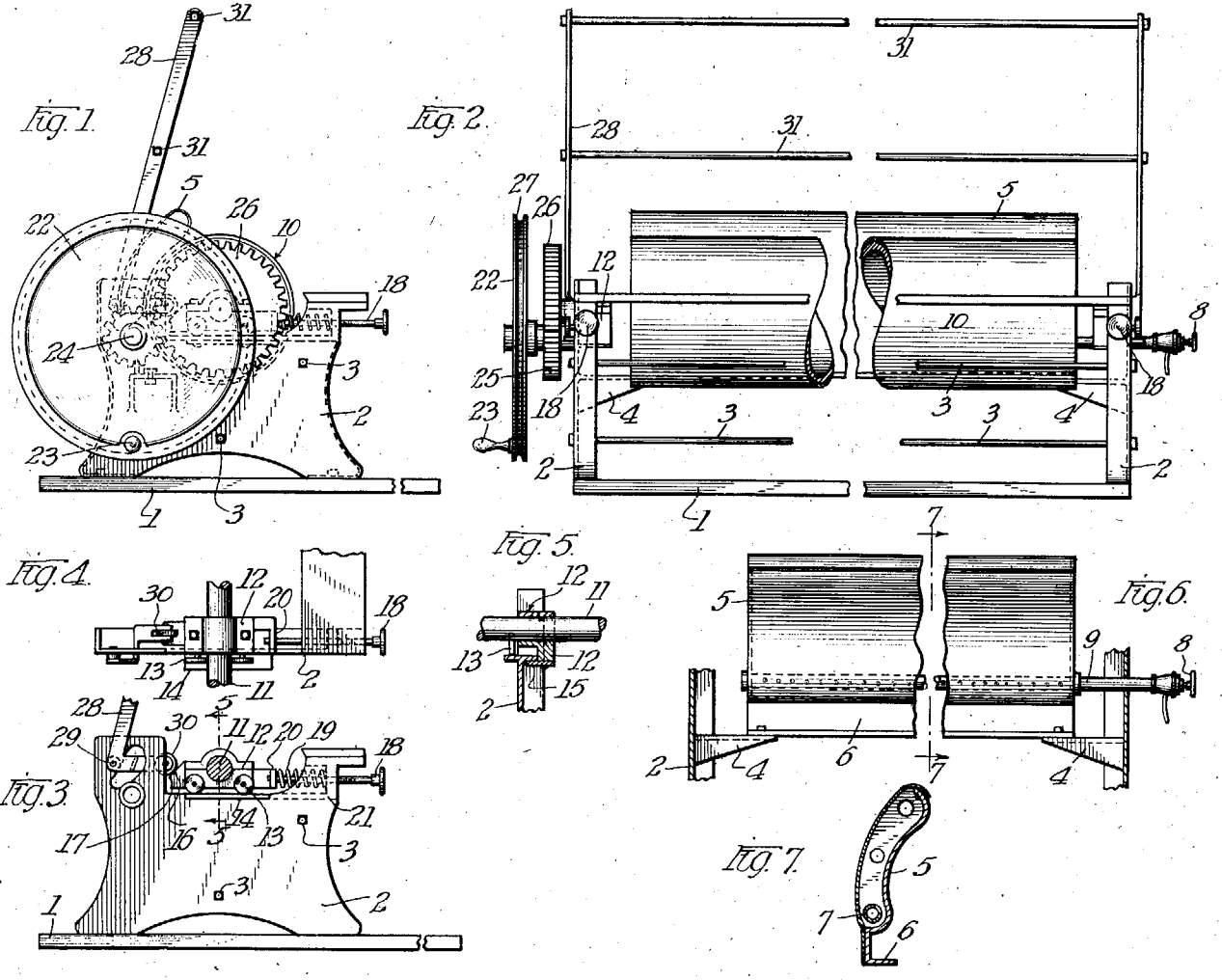
Witnesses:
Robert H. Weir
Sebastian Hunter
Inventor
Axel R. Gustafson
Walter R. Lane Attys.

UNITED STATES PATENT OFFICE.

AXEL R. GUSTAFSON, OF CHICAGO, ILLINOIS, ASSIGNOR TO HORTON MANUFACTURING COMPANY, OF FORT WAYNE, INDIANA, A CORPORATION OF INDIANA.

IRONING-MACHINE.

14,074. Specification of Reissued Letters Patent. Reissued Feb. 22, 1916.

Original No. 1,097,016, dated May 19, 1914, Serial No. 771,409. Application for reissue filed January 3, 1916. Serial No. 70,054.

*To all whom it may concern:*

Be it known that I, AXEL R. GUSTAFSON, a citizen of the United States, residing at Chicago, in the county of Cook and State of Illinois, have invented certain new and useful Improvements in Ironing-Machines, of which the following is the specification.

My present invention relates to improvements in ironing machines and is designed to improve the construction and operation of the hand and table type of ironing machines.

The primary object of the invention is to simplify the construction and facilitate the operation of hand operated machines so that the movement of the machine may be accomplished without undue exertion of the operator, and also time as well as labor may be saved.

The invention consists essentially in the combination and arrangement of parts by which the machine of the above characteristics is produced, as will appear more fully hereinafter.

In the accompanying drawings I have illustrated one complete example of the physical embodiment of my invention constructed and operated according to the best mode I have so far devised for the practical application of the principles of the invention.

While I shall hereinafter refer to the machine as hand operated, it will be noted that the machine is equipped with means by which power may be utilized to drive the machine, if desired or required.

In the accompanying drawings in which similar reference characters indicate like parts throughout the figures: Figure 1 is a side elevation complete of a machine built in accordance with my present invention. Fig. 2 is a front elevation of the machine of Fig. 1, partly broken away for convenience of illustration. Fig. 3 is a detail elevation at one end of the machine (as in Fig. 1) with the balance wheel or drive wheel omitted. Fig. 4 is a top plan view of the parts of the machine illustrated in Fig. 3. Fig. 5 is a detail sectional view on line 5—5 of Fig. 3. Fig. 6 is a detail elevation, partly broken away and part in section of the stationary "shoe" or iron forming part of the machine. Fig. 7 is a sectional view on line 7—7 of Fig. 6

In the preferred embodiment of my invention as depicted in the accompanying drawings a "table" machine is illustrated equipped with the present invention, the table being indicated by the numeral 1. The machine is supported upon the table at a proper and convenient height, and is provided with side plates or frame members 2, 2, preferably of metal and connected by the brace rods 3, 3, to give rigidity to the machine support, and the frame members are securely fastened to the table top, as shown in dotted line Fig. 1. Each of the side plates is fashioned with an integral shelf or bracket 4, 4, upon which the stationary "shoe" or iron 5 is bolted, the latter being formed with a flanged foot 6 by which the iron is bolted to the brackets.

The customary gas heater 7 is located in the lower portion of the hollow iron 5 and the heater or burner is controlled by the valve 8 as usual which regulates passage of gas through the pipe 9. The iron is thus stationary and fixed to the supporting frame of the machine. The padded roll 10, however, may be moved toward or away from the iron, as desired. This roll is fixed upon the shaft 11, and the shaft is journaled at each end, in a carriage 12. Each carriage is equipped with a pair of wheels 13 that are adapted to travel on the horizontal flange 14 of the side plates 2, and a guard plate 15 is also attached to each carriage to guide the carriage and guard against displacement thereof. In Fig. 3 it will be noted that the rear end of the carriage is formed with an inclined or beveled edge which terminates in a notch or recess 17. This construction is present on both carriages, as is also the screw bar 18 and its spring 19, the screw bar being threaded into a flange 21 of the frame plate, and each screw bar extends loosely through a perforation in a flange 20 of a carriage. A coiled spring 19 surrounds the bar, is guided thereby, and is located between the flange 21 and the carriage. The springs 19 urge the carriages and through them the padded roll toward the hollow heated iron, so that the articles may be ironed as they pass between the roll and iron.

The padded roll may be revolved from the wheel 22 which has a handle 23 and is fixed on shaft 24 journaled in one of the side plates. The shaft 24 carries a pinion 25 which meshes with a gear 26 fixed on the shaft 11. Thus by rotating the wheel 22 the padded roll is revolved, either by hand power applied at the handle 23, or a belt or rope from a motor may be passed over the groove 27 of the wheel 22 to revolve the roll.

The padded roll may be shifted from proximity with the iron by means of the levers 28, 28, which are pivoted in the frame at 29, 29, and provided with anti-friction wheels 30 normally in contact with the beveled or inclined edge 16 of each carriage. The levers 28, 28 are connected by cross braces or rods 31 to move in unison, so that when the operator swings the levers backward (toward the left in Fig. 1) the carriages and padded roll are moved forward, the carriages traveling by means of their wheels over the flanged head 14 of the side frames. The carriages are moved against the tension of the springs 19, so that when pressure is released from the levers, the springs will return the carriages and roll to place. By pulling the levers forward to their extremes, the wheel 30 traveling down the incline 16 shoves the carriage and eventually seats itself in the notch or recess 17, and when in this position, the carriages may be held out of operative position relatively to the iron. To release the carriages the levers are pushed to the left in Fig. 1, and the springs return the carriages to proper position.

Having thus fully described my invention, I claim:

1. The combination in an ironing machine with a stationary hollow heated iron and a supporting frame, of a padded roll, a horizontal, flanged head on the frame at each end of the roll, a wheeled carriage adapted to travel on each flanged head and said carriages supporting the roll, screw-threaded bars threaded into the frame and loosely engaging the carriages, springs surrounding the bars and located between the frame and the carriages to force the roll toward the iron, and means for moving the carriages against the tension of the springs.

2. In an ironing machine, the combination with wheeled carriages supporting a padded roll, a supporting frame having horizontal tracks for said carriages, springs between said frame and carriages, each carriage formed with an inclined edge terminating in a recess, and pivoted levers having rollers normally in contact with said inclined edges, and said rollers adapted to fit and engage in the recesses of the inclined edges to hold the carriages out of operative position.

3. In apparatus of the class described, a shoe, a carriage having a roll thereon, resilient means acting on the carriage and tending to force the same toward the shoe, a lever acting independently of the resilient means and having a part acting directly upon said carriage to force the same against the resilient means whereby the roll floats between the pressure of the spring and the lever and is readily controllable by the operator.

4. In a mangle, a stationary ironing element, a movable carriage having a second ironing element thereon, a resilient means for forcing said carriage toward said stationary ironing element, a lever means independent of said resilient means for forcing said carriage away from said stationary element, including means for locking said carriage away from said stationary element, all so constructed and arranged that the carriage floats between the resilient means and the lever and may be instantly shifted and readily controlled by the operator.

In witness whereof, I hereunto subscribe my name to this specification in the presence of two witnesses.

AXEL R. GUSTAFSON.

Witnesses:
SEBASTIAN HINTON,
MARGARET J. RYAN.